(12) United States Patent
Bignon et al.

(10) Patent No.: US 10,272,453 B2
(45) Date of Patent: Apr. 30, 2019

(54) SYSTEM FOR APPLYING A FLUID TO A SURFACE

(71) Applicant: Airbus Operations SAS, Toulouse (FR)

(72) Inventors: Nicolas Bignon, Saint Aignan Grandlieu (FR); Pierre-Albert Landel, Nantes (FR); Lucile Gouzerh, Nantes (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 15/357,604

(22) Filed: Nov. 21, 2016

(65) Prior Publication Data

US 2017/0144175 A1 May 25, 2017

(30) Foreign Application Priority Data

Nov. 25, 2015 (FR) ...................................... 15 61377

(51) Int. Cl.
| | | |
|---|---|---|
| *B05B 3/18* | (2006.01) | |
| *B05B 9/00* | (2006.01) | |
| *B05C 1/06* | (2006.01) | |
| *B29C 33/58* | (2006.01) | |
| *B25J 9/16* | (2006.01) | |

(Continued)

(52) U.S. Cl.
CPC ................ *B05B 3/18* (2013.01); *B05B 9/007* (2013.01); *B05C 1/06* (2013.01); *B25J 9/1666* (2013.01); *B29C 33/58* (2013.01); *B05B 1/20* (2013.01); *B05C 5/027* (2013.01)

(58) Field of Classification Search
USPC ................ 118/300, 313–315, 712, 305, 323; 239/146–150, 159
See application file for complete search history.

(56) References Cited

U.S. PATENT DOCUMENTS

| 4,246,674 A | * | 1/1981 | Ingermann | ............ A47L 11/282 |
| | | | | 15/4 |
| 5,084,171 A | * | 1/1992 | Murphy | ................ E02B 15/101 |
| | | | | 210/238 |

(Continued)

FOREIGN PATENT DOCUMENTS

| DE | 102014116375 B3 | 10/2015 |
| FR | 1019004 | 1/1953 |
| JP | 2016048474 A | 4/2016 |

OTHER PUBLICATIONS

French Search Report, dated Jun. 28, 2016, priority document.

*Primary Examiner* — Yewebdar T Tadesse
(74) *Attorney, Agent, or Firm* — Greer, Burns & Crain, Ltd.

(57) ABSTRACT

An application system for depositing a fluid product on a surface. The application system comprises a frame mounted on a locomotive system ensuring the displacement of the frame over the surface, a tank mounted on the frame and receiving the fluid product to be applied, and an application head fluidically connected with the tank via a supply nozzle. The application system comprises a guiding system which comprises detectors to detect the obstacles in the environment of the application system. Such an application system allows for an even application of the fluid product over the entire surface.

13 Claims, 6 Drawing Sheets

(51) Int. Cl.
*B05B 1/20* (2006.01)
*B05C 5/02* (2006.01)

(56) References Cited

U.S. PATENT DOCUMENTS

| | | | |
|---|---|---|---|
| 6,406,043 B1* | 6/2002 | Balmer | B60B 35/003 |
| | | | 180/403 |
| 2006/0278161 A1* | 12/2006 | Burkholder | A47L 11/03 |
| | | | 118/323 |
| 2013/0304300 A1* | 11/2013 | Peake | B62D 15/025 |
| | | | 701/23 |
| 2014/0044867 A1 | 2/2014 | Lytle et al. | |
| 2014/0120251 A1* | 5/2014 | Grimm | E01C 23/222 |
| | | | 427/137 |
| 2014/0283744 A1 | 9/2014 | Galvin et al. | |
| 2015/0143646 A1 | 5/2015 | Jeong et al. | |

* cited by examiner

SYSTEM FOR APPLYING A FLUID TO A SURFACE

CROSS-REFERENCES TO RELATED APPLICATIONS

This application claims the benefit of the French patent application No. 1561377 filed on Nov. 25, 2015, the entire disclosures of which are incorporated herein by way of reference.

BACKGROUND OF THE INVENTION

The present invention relates to a system for applying a fluid to a surface, in particular, a mold-stripping agent to the surface of a mold, and a method for applying a fluid product implemented by such an application system.

The mold-stripping of a molded part, produced, for example, in composite materials, is simplified by the application of a mold-stripping agent to the surface of the mold prior to the molding of the part.

Currently, the application of such a mold-stripping agent is performed manually by an operator who deposits the mold-stripping agent using a cloth soaked with a mold-stripping agent. After a phase of partial cross-linking of the mold-stripping agent, the application is continued with a smoothing using a cloth and after the total cross-linking of the mold-stripping agent, a new layer of mold-stripping agent can be applied.

When the mold has a large surface area over which the mold-stripping agent has to be applied, such an application takes a relatively long time for an operator. Furthermore, such an application cannot be repeated because that depends on many factors such as, for example, the experience of the operator, the percentage of soaking of the cloth by the mold-stripping agent.

The document FR-A-1 019 004 discloses a system for applying a fluid product on furniture, the document US-A-2014/0283744 discloses a system for applying an adhesive, and the document US-A-2014/0044867 discloses a spray for applying a fluid product.

SUMMARY OF THE INVENTION

One object of the present invention is to propose a system for applying a fluid to a surface, in particular a mold-stripping agent to the surface of a mold, which does not exhibit the drawbacks of the prior art and which in particular allows for a better repeatability of the application.

To this end there is proposed an application system for depositing a fluid product on a surface, the application system comprising:
 a frame mounted on a locomotive system ensuring the displacement of the frame over the surface,
 a tank mounted on the frame and receiving the fluid product to be applied, and
 an application head fluidically connected with the tank via one supply nozzle,
 wherein the application system comprises a guiding system which comprises means for detecting the obstacles around the application system.

Such an application system thus allows for the application of a known quantity of fluid product and high repeatability of the application whatever the obstacles.

According to a particular embodiment, the application head comprises several ejection nozzles distributed transversely under the application head and fluidically connected with the supply nozzle.

According to a particular embodiment, the application head comprises:
 a cloth arranged under the application head and
 at least one ejection nozzle fluidically connected with the supply nozzle and arranged so that the fluid product flowing from the at least one ejection nozzle soaks the cloth.

According to another particular embodiment, the application head comprises:
 a cloth arranged under the application head and
 at least one ejection nozzle fluidically connected with the supply nozzle and arranged so that the fluid product flowing from the at least one ejection nozzle is projected forward of the cloth.

Advantageously, the guiding system comprises, in the direction of advance of the application system:
 two contact detectors arranged at the front of the frame, one on the port side and the other on the starboard side, and
 two void detectors under the frame and at the front of the locomotive system, one on the port side and the other on the starboard side.

Advantageously, the application head is arranged at the rear of the locomotive system in the direction of advance of the application system.

According to a particular embodiment, the frame is made of a towing frame and a drawn frame, the towing frame carrying the locomotive system and the motor-drive system, the drawn frame carrying the application head, and the towing frame and the drawn frame are linked by a flexible fastener.

According to a particular embodiment, the frame comprises a main part which supports the locomotive system and a secondary part which is mounted to be rotationally mobile around the main part and which supports the tank, the application head and the supply nozzle.

According to another particular embodiment, the frame comprises a main part which supports the locomotive system and a secondary part which is mounted to be rotationally mobile inside the main part and which supports the tank, the application head and the supply nozzle.

According to a first variant, the locomotive system comprises at least two wheels.

Advantageously, each wheel is mounted on the frame through a suspension.

According to another variant, the locomotive system comprises two parallel tracks, the tread of each track comprises several suckers, and the application system comprises a vacuum generation device fluidically connected to each sucker in order to generate vacuum at each of the suckers in contact with the surface.

Advantageously, the application system comprises at least one light arranged at the rear of the application system to illuminate the surface at the rear of the application head.

Advantageously, the application system comprises a memory intended to record a path to follow on the surface from a start point, and the guiding system is adapted to read the path, bring the application system to the start point and lead the application system according to the path.

The invention also proposes a method for applying a fluid product using an application system according to one of the preceding embodiments, the method comprising:
 a positioning step during which the application system is positioned along a first edge of the surface,
 a pre-progression step during which the application system progresses along the first edge until it reaches a second edge, a first reorientation step during which the application system makes a half-turn, a first progression step during which the application system progresses until it reaches a third edge, a first test step during which the control unit checks to see if all the surface has been covered with fluid product, in the case where all the surface has been covered, the method is stopped, otherwise, the method is continued by a second reorientation step during which the application system makes a half-turn, a second progression step during which the application system progresses until it reaches the second edge, a second test step during which the control unit checks to see if all the surface has been covered with fluid product, in the case where all the surface has been covered, the method is stopped, otherwise, the method is continued by a loop back step during which the method loops back to the first orientation step.

Advantageously, the first test step is realized simultaneously with the first progression step, and the second test step is realized simultaneously with the second progression step.

BRIEF DESCRIPTION OF THE DRAWINGS

The features of the invention mentioned above, and others, will become more clearly apparent on reading the following description of an exemplary embodiment, the description being given in relation to the attached drawings, in which.

DETAILED DESCRIPTION OF THE PREFERRED EMBODIMENTS

In the following description, the terms relating to a position are taken with reference to an application system in position of use, that is to say as represented in FIGS. 1, 2 and 4 to 7.

Figure 1:
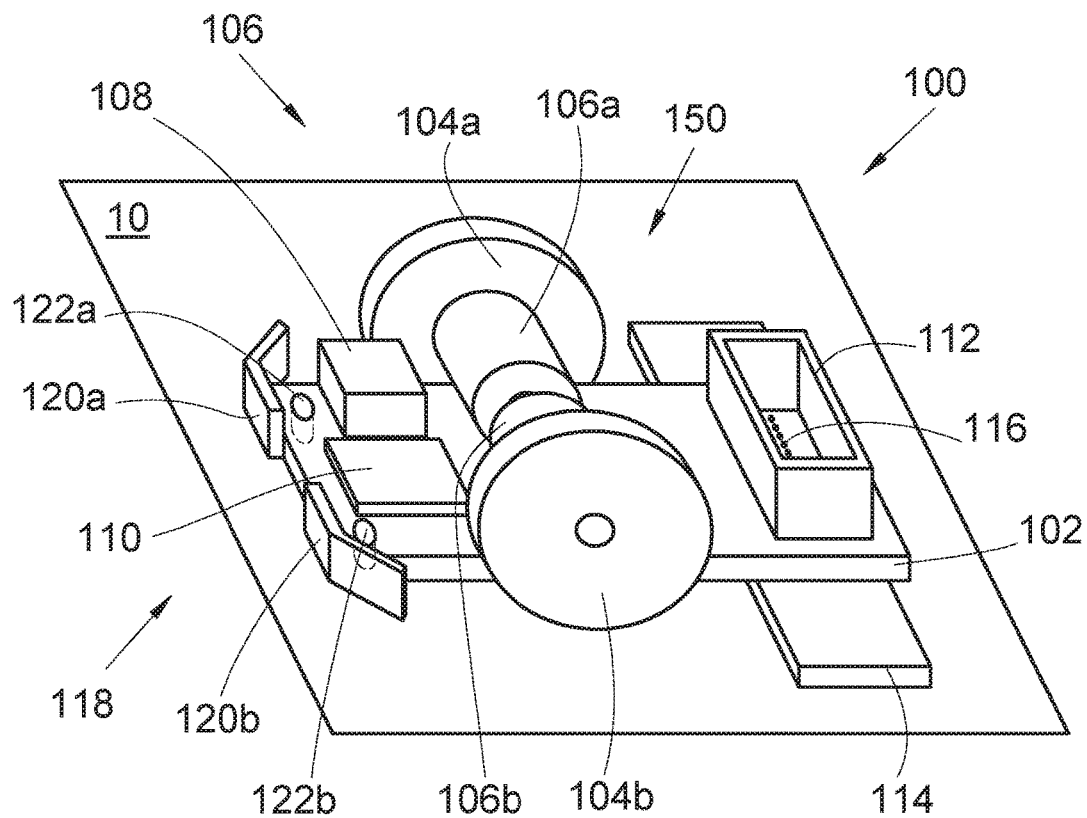
FIG. 1 shows, in perspective and in plan view, an application system according to a first embodiment of the invention.
Figure 2:
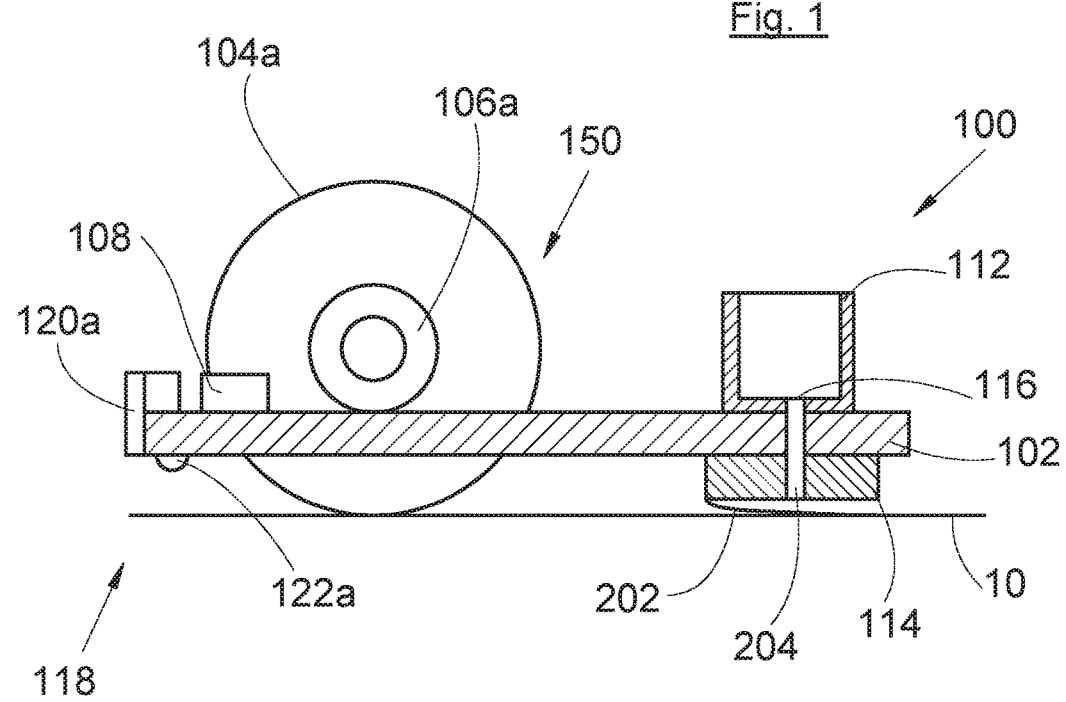
FIG. 2 shows, in side view and in cross section through a vertical median plane, the application system of FIG. 1.

FIG. 1 and FIG. 2 show an application system 100 according to a first embodiment which makes it possible to deposit a fluid product on a surface 10, such as, for example, a mold-stripping agent on the surface of a mold.

The application system 100 comprises a frame 102 mounted on a locomotive system 150 ensuring the displacement of the frame 102 over the surface 10.

In the embodiment represented in FIGS. 1 and 2, the locomotive system 150 comprises two wheels 104a-b and the application system 100 comprises a motor-drive system 106 driving the wheels 104a-b in rotation.

Here, there are four wheels 104a-b, but there could be more. The motor-drive system 106 comprises, for example, a motor common to the different wheels 104a-b and coupled to a rotation mechanism of the wheels 104a-b. Preferably, the motor-drive system 106 comprises a motor 106a-b for each wheel 104a-b in order to independently control each wheel 104a-b and, in particular, the speed of rotation of each wheel 104a-b. Thus, the motor-drive system 106 can generate a rotation speed differential of the wheels 104a-b which allows the rotation of the application system 100. The positions of the wheels 104a-b are known by all the known encoding systems such as, for example, an electromechanical encoder, or an incremental coder. To ensure a stop of the application system 100, each or at least one motor is equipped with a brake.

The frame 102 also carried a battery 108. Thus, the application system 100 is energy-autonomous.

The frame 102 also carries a control unit 110 which is powered with current from the battery 108 and which controls the motor-drive system 106.

The application system 100 also has a tank 112 mounted on the frame 102 and receiving the fluid product to be applied.

The application system 100 also has an application head 114 fluidically connected with the tank 112, here via at least one supply nozzle 116 which emerges in the application head 114 arranged facing the surface 10 to be covered. The application head 114 comprises distribution means which are arranged to distribute the fluid product received from the supply nozzle 116 over the surface 10. The distribution means are arranged in order for the fluid product to be deposited over the surface 10 after the passage of the locomotive system 150 over this surface 10.

According to a variant, the application system 100 comprises a stopwatch (not represented) linked with the control unit 110.

When in use, the application system 100 is displaced over the surface 10 by virtue of the locomotive system 150 and the fluid product is then applied evenly by virtue of the application head 114 and its application is repeatable.

The distribution means are, for example, several ejection nozzles 204 distributed transversely under the application head 114 and fluidically connected with the supply nozzle 116. Each ejection nozzle 204 is thus supplied with fluid product by the supply nozzle 116 and sprays a determined quantity of fluid product over the surface 10. Preferentially, the quantity of fluid product sprayed is identical from one ejection nozzle 204 to another.

The quantity of fluid product which flows through each ejection nozzle 204 can be controlled by the control unit 110, for example by fitting an appropriate ejection pump which picks up the fluid product in the tank 112 by the supply nozzle 116 and expels the fluid products through the ejection nozzles 204. The ejection pump is then controlled by the control unit 110.

According to another embodiment, the quantity of fluid product which flows through each ejection nozzle 204 can be controlled by the control unit 110, for example by fitting a drop-counter.

According to another embodiment, the quantity of fluid product which is sprayed by the ejection nozzles 204 is regulated by the diameter of the ejection nozzles 204.

As is represented in FIG. 2, the distribution means can comprise:

- a cloth 202 which is fixed to the application head 114 and which extends under the application head 114 and
- at least one ejection nozzle 204 fluidically connected with the supply nozzle 116 and arranged so that the fluid product flowing from the at least one ejection nozzle 204 soaks the cloth 202. Each ejection nozzle 204 is thus supplied with fluid product by the supply nozzle 116 and deposits a determined quantity of fluid product over the cloth 202. The cloth 202 is thus soaked with fluid product and applies it to the surface 10 upon the displacement of the application system 100. The quantity of fluid product which flows onto the cloth 202 is regulated by the diameter of the ejection nozzles 204.

Figure 4:
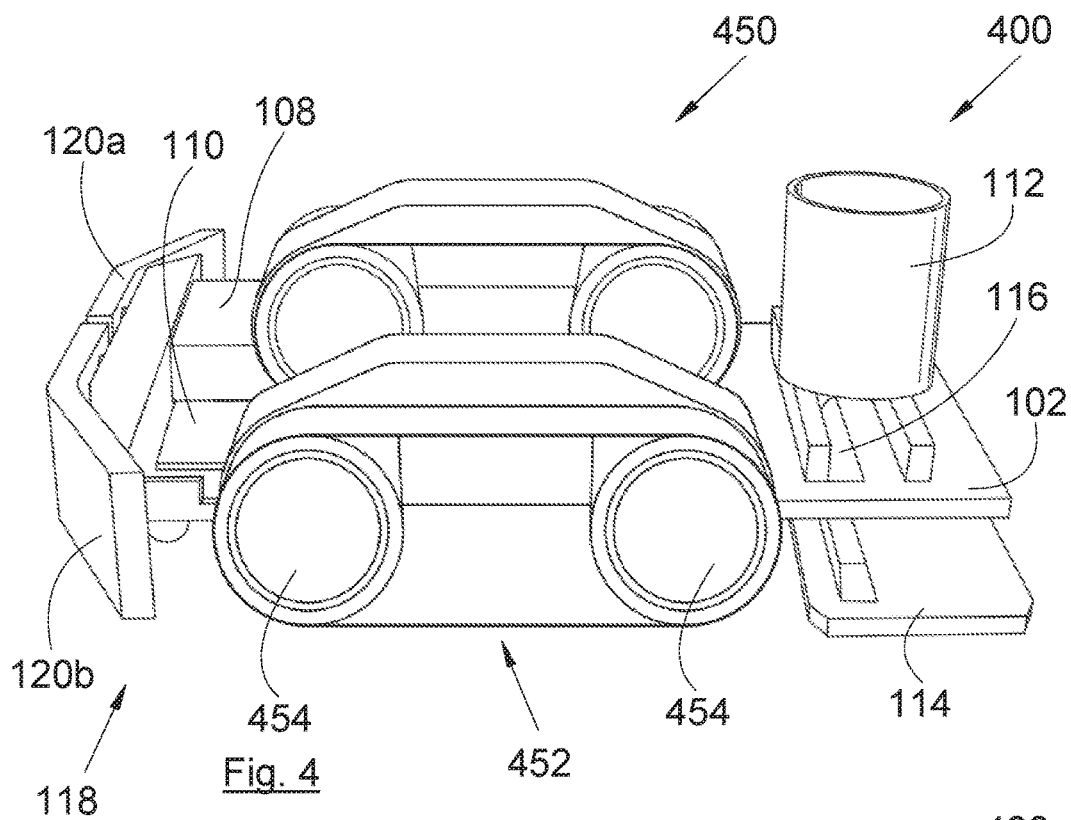
FIG. 4 shows, in perspective and in plan view, an application system according to a second embodiment of the invention.
Figure 5:
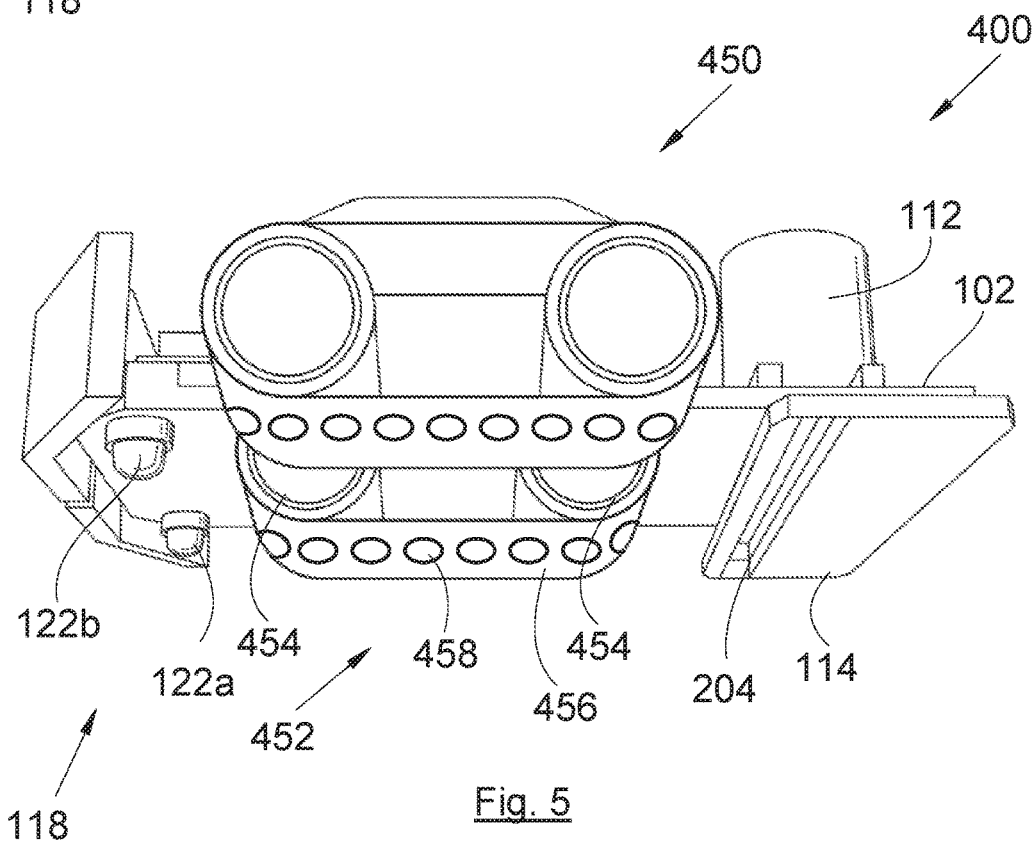
FIG. 5 shows, in perspective and in underside view, the application system according to the second embodiment of the invention.

FIGS. 4 and 5 show an application system 400 according to second embodiment of the invention which is similar to the first embodiment except with respect to the locomotive system 450.

The locomotive system 450 comprises two parallel tracks 452, each being kept taut between two wheels 454 of which at least one is driven in rotation by a motor-drive system.

The tread 456 of each track 452 comprises several suckers 458. Each sucker 458 is fluidically connected to a vacuum generation device of the application system 400 by a depressurizing circuit (not represented) in order to generate vacuum at each of the suckers 458 which is in contact with the surface 10. In this embodiment, the application device 400 can be used on molds of complex geometries having reliefs, such as over thicknesses created by fold overlaps in a composite part.

Figure 6:
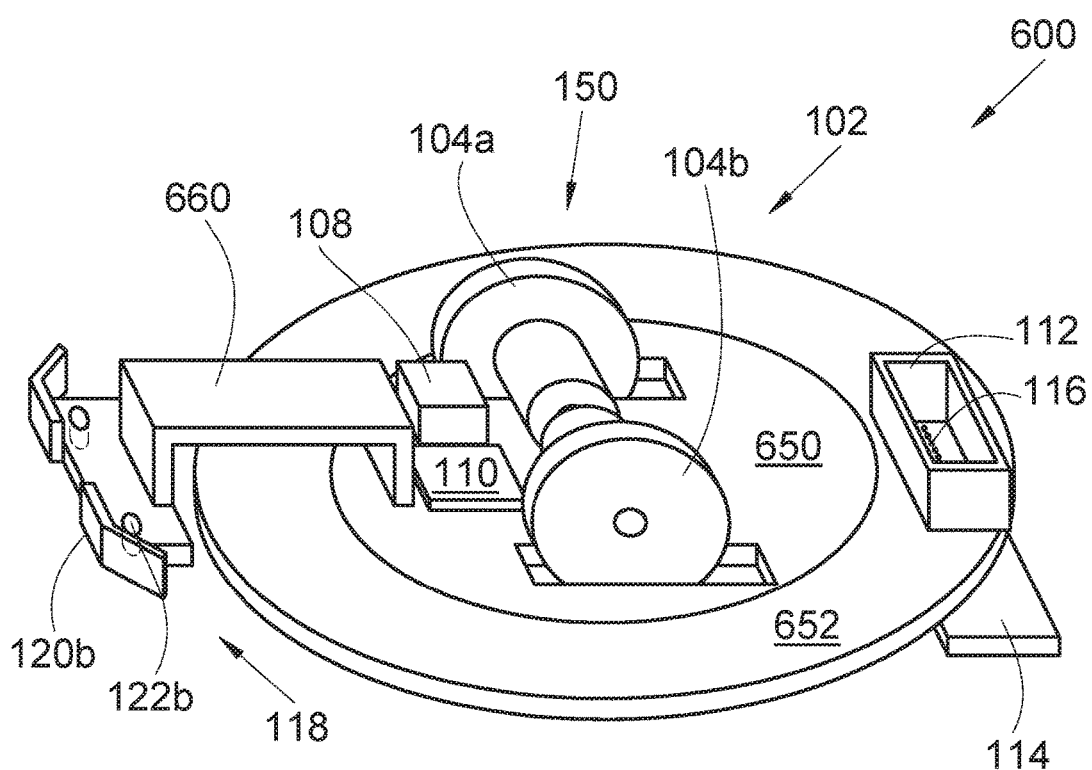
FIG. 6 shows, in perspective and in plan view, an application system according to a third embodiment of the invention.

FIG. 6 shows an application system 600 according to a third embodiment of the invention. In this embodiment, the locomotive system 150 is identical to that of the first embodiment, but it could be identical to that of the second embodiment.

The application system 600 is distinguished from the first embodiment by the fact that the frame 102 comprises a main part 650 and a secondary part 652 which is mounted to be rotationally mobile around the main part 650. The main part 650 thus takes the form of a disc and the secondary part 652 takes the form of a ring, the inner circular void of which receives the main part 650.

The main part 650 supports the locomotive system 150 and the secondary part 652 supports the tank 112, the application head 114 and the supply nozzle 116.

Such an architecture makes it possible to deposit fluid product around the application system 600 by orienting the secondary part 652.

The orientation of the secondary part 652 can be performed manually or mechanically by fitting an appropriate motor-drive system.

Figure 7:
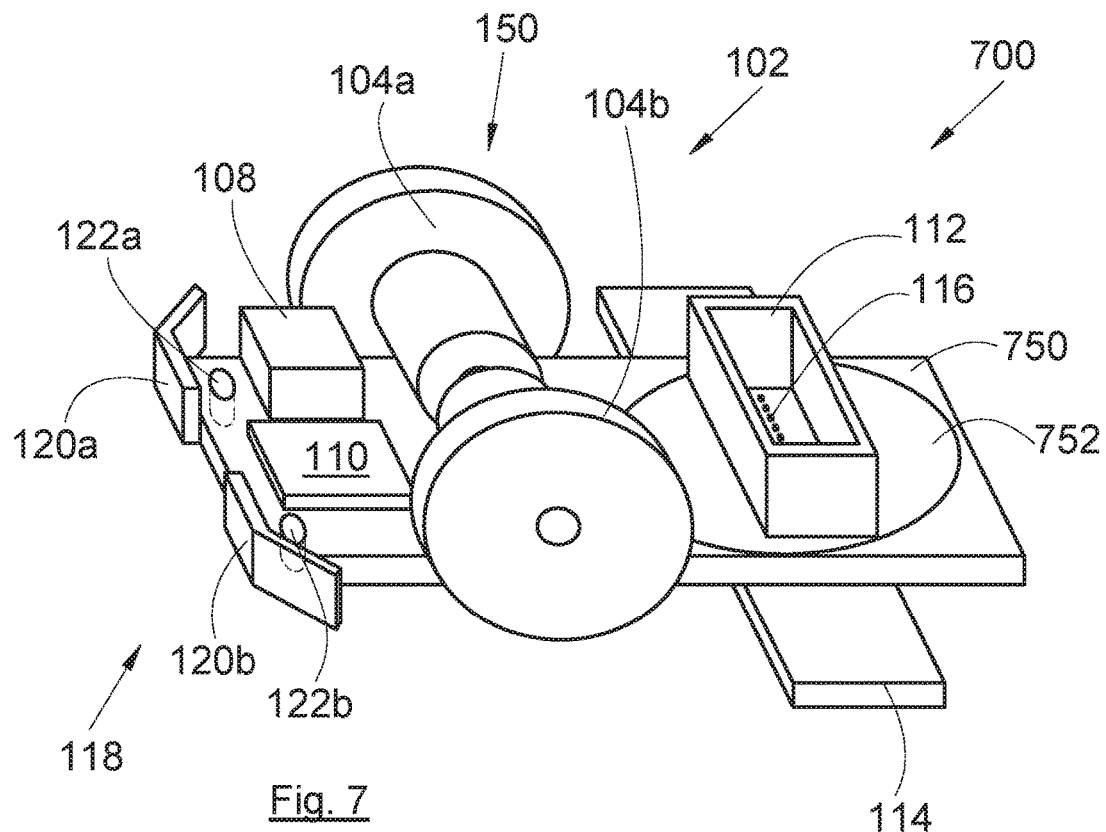
FIG. 7 shows, in perspective and in plan view, an application system according to a fourth embodiment of the invention, FIG. 8 schematically illustrates the architecture of a control unit of the application system.

FIG. 7 shows an application system 700 according to a fourth embodiment of the invention. In this embodiment, the locomotive system 150 is identical to that of the first embodiment, but it could be identical to that of the second embodiment.

The application system 700 is distinguished from the first embodiment by the fact that the frame 102 comprises a main part 750 and a secondary part 752 which is mounted to be rotationally mobile inside the main part 750. The main part 750 thus has a circular void inside which the secondary part 752 in the form of a disc is mounted.

The main part 750 supports the locomotive system 150 and the secondary part 752 supports the tank 112, the application head 114 and the supply nozzle 116.

Such an architecture makes it possible to apply a particular orientation of the supply head 114 or a rotary movement of the cloth 202 upon the application of the fluid product.

The orientation of the secondary part 752 can be performed manually or mechanically by fitting an appropriate motor-drive system.

In the third embodiment and the fourth embodiment, the rotation of the secondary part 652, 752 is performed about an axis of rotation at right angles to the plane of the surface 10.

Each application system 100, 400, 600, 700 has a guiding system 118 which comprises means for detecting the obstacles around the application system 100, 400, 600, 700. The guiding system 118 makes it possible to detect the obstacles such as voids and frontal obstacles. The guiding system 118 then informs the control unit 110 concerning the environment of the application system 100, 400, 600, 700 for the control unit 110 to control the displacement of the application system 100 accordingly. Thus, the application system 100, 400, 600, 700 is autonomous in its displacement.

In the embodiment of the invention presented in FIGS. 1, 2 and 4 to 7, the guiding system 118 comprises a set of obstacle detectors which here comprises, in the direction of advance of the application system 100, 400, 600, 700:

- two contact detectors 120a-b arranged at the front of the frame 102, one on the port side and the other on the starboard side, and
- two void detectors 122a-b under the frame 102 and at the front of the locomotive system 150, 450, one on the port side and the other on the starboard side.

The contact detectors 120a-b detect when the frame 102 enters into contact with a protruding part (such as a wall). Because there is a contact detector 120a-b on each side, the control unit 110 can determine on which side the obstacle is and thus undertake a turn to the appropriate side to clear the application system 100 of the frontal obstacle.

The void detectors 122a-b detect when the front of the frame 102 is above a void. As for the contact detectors 120a-b, the fact that there is a void detector 122a-b on each side enables the control unit 110 to determine on which side the void is and thus undertake a turn to the appropriate side to clear the application system 100, 400, 600, 700 of the void and avoid falling therein.

The guiding system 118 is arranged at the front of the locomotive system 150, 450 so the obstacle (protruding part or void) is detected before the locomotive system 150, 450 is blocked on this obstacle and the control unit 110 can undertake the appropriate movements to clear the application system 100, 400, 600, 700 of the obstacle.

To avoid having the wheels 104a-b or the tracks 452 roll over the fluid product just applied, the application head 114 and, in particular, the cloth 202 are arranged at the rear of the locomotive system 150 in the direction of advance of the application system 100, 400, 600, 700 upon application.

In the case of the third embodiment, the guiding system 118 is arranged on an arch 660 at which one end is secured to the main part 650 and of which the other end projects over the secondary part 652, in front thereof in the direction of advance of the application system 600 upon application of the fluid product and bears the guiding system 118.

The arch 660 is provided to also allow the passage of the tank 112 and of the application head 114 upon the rotation of the secondary part 652.

Figure 3:
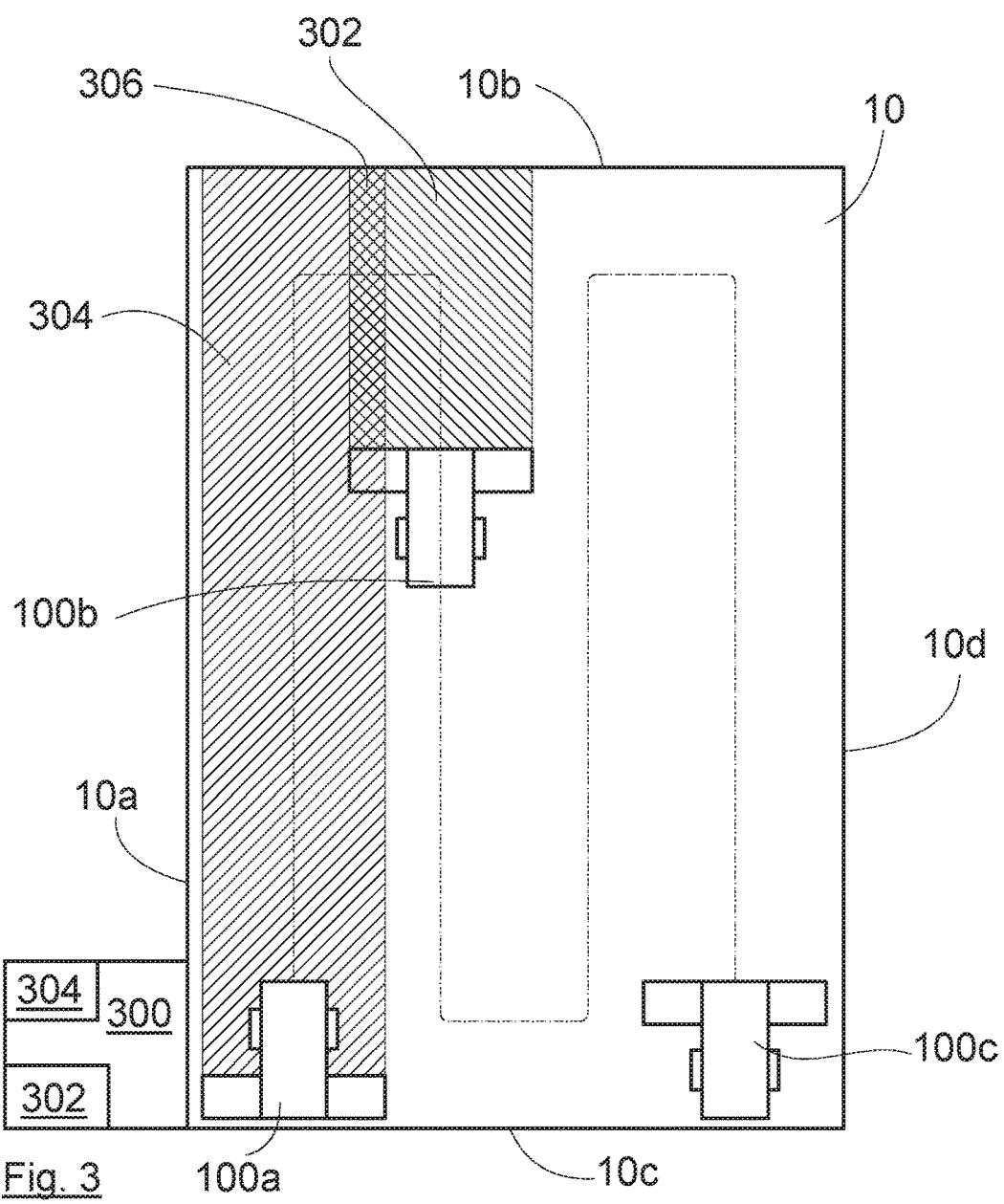
FIG. 3 shows, in plan view, an example of displacement of an application system according to the invention.

FIG. 3 shows an example of displacement of the application system 100a-c over the surface 10. In the embodiment of FIG. 3, the application system represented is that of the first embodiment, but the operation is identical for the application systems of the other embodiments. The reference 100a corresponds to the application system in starting position, the reference 100c corresponds to the application system in final position and the reference 100b corresponds to the application system in intermediate position between the starting position and the final position.

In the embodiment represented in FIG. 3, the surface 10 is delimited around by a void, but in another embodiment, it can be delimited by walls or by a mixture of voids and walls. Each edge 10a-d of the surface 10 can therefore be delimited by a void or a wall.

To cover all the surface 10 with fluid product, the application system 100 is positioned in starting position along a first edge 10a of the surface 10, the application system 100 progresses along the first edge 10a until it reaches a second edge 10b, the application system 100 then makes a half-turn to progress in the reverse direction until it encounters a third edge 10c. The application system 100 then makes round trips between the second edge 10b and the third edge 10c by progressing from the first edge 10a to the fourth edge 10d. When it reaches the fourth edge 10d, the application system 100 makes a last crossing to reach the final position.

In the embodiment represented in FIG. 3, the surface is rectangular, but it can also take another form and the application system 100 will be displaced in the same way in order to cover all the surface 10.

Figure 9:
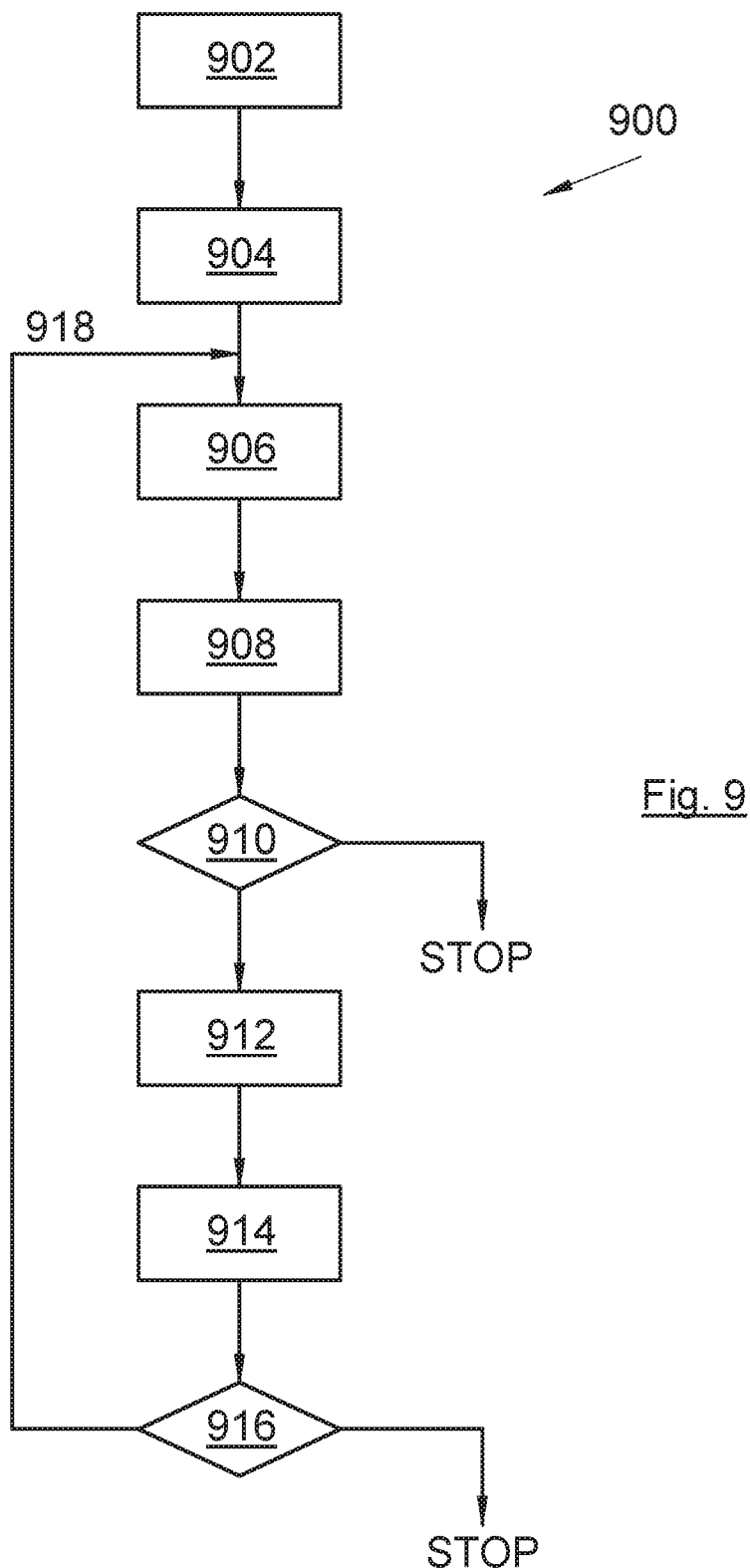
FIG. 9 shows an algorithm of an application method according to the invention.

FIG. 9 shows an algorithm of a method for applying 900 a fluid product using the application system 100, 400, 600, 700 which thus comprises:

- a positioning step 902 during which the application system is positioned, for example manually, along the first edge 10a of the surface 10,
- a pre-progression step 904 during which the application system progresses along the first edge 10a until it reaches the second edge 10b,
- a first reorientation step 906 during which the application system 100 makes a half-turn,
- a first progression step 908 during which the application system progresses until it reaches the third edge 10c,
- a first test step 910 during which, the control unit 110 checks to see if all the surface 10 has been covered with fluid product, in the case where all the surface 10 has been covered, the method is stopped, otherwise, the method is continued by

- a second reorientation step 912 during which the application system 100 makes a half-turn,
- a second progression step 914 during which the application system progresses until it reaches the second edge 10b,
- a second test step 916 during which the control unit 110 checks to see if all the surface 10 has been covered with fluid product, in the case where all the surface 10 has been covered, the method is stopped, otherwise, the method is continued by a loop back step 918 during which the method loops back to the first reorientation step 906.

Advantageously, the first test step 910 is realized simultaneously with the first progression step 908 and the second test step 916 is realized simultaneously with the second progression step 914.

The detection of edges 10a-d to follow an edge or to detect the end of a crossing is performed by the guiding system 118, and depending on the structure of the edges 10a-d (void or walls), either the contact detectors 120a-b or the void detectors 122a-b detect the edges 10a-d.

The detection of the edges 10a-d can also be performed by the storage, in a memory of the application system, of the plan of the surface 10.

During the pre-progression step 904, the first reorientation step 906, the first progression step 908, the second reorientation step 912 and the second progression step 914, the fluid product flows from the application head 114.

Obviously other types of displacements can be envisaged depending on the topography of the surface 10.

Along two adjacent paths, the fluid product deposited on one pass partly overlaps the fluid product deposited on the early pass, thus, no part of the surface 10 remains without fluid product. In FIG. 3, the fluid product 302 deposited after a half-turn partly overlaps the fluid product 304 deposited before the half-turn.

To avoid having the wheels 104a-b rolled in the fluid product already deposited, the application head 114 extends transversely beyond the wheels 104a-b and the width of the overlapping part 306 is at most equal to the length of the application head 114 which extends beyond the wheels 104a-b.

The independence between the two wheels 104a-b allows the application system 100 to perform relatively tight half-turns.

Figure 8:
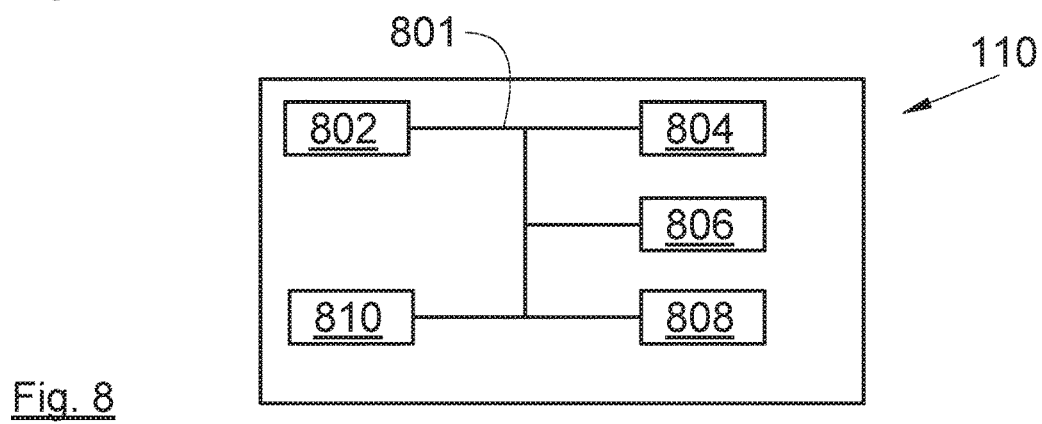

FIG. 8 represents the architecture of the control unit 110 which comprises, linked by a communication bus 801: a processor 802 or CPU "Central Processing Unit;" a Random Access Memory RAM 804; a Read Only Memory ROM 806; a storage unit such as a hard disc or a storage medium reader, such as an SD (Secure Digital) card reader 808; at least one communication interface 810, for example allowing the processing unit to communicate with the motor-drive system 106 and the guiding system 118.

The processor is capable of executing instructions loaded into the RAM from the ROM, from an external memory (not represented), from a storage medium (such as an SD card), or from a communication network. When the equipment is powered up, the processor is capable of reading instructions from the RAM and of executing them. These instructions form a computer program causing the implementation, by the processor, of all or part of the algorithms and steps described above.

All or part of the algorithms and steps described above can be implemented in software form by the execution of a set of instructions by a programmable machine, for example a DSP (Digital Signal Processor) or a microcontroller, or be implemented in hardware form by a machine or dedicated component, for example an FPGA (Field-Programmable Gate Array or an ASIC (Application-Specific Integrated Circuit).

In another application, the application system 100 can also be used for a mold dusting step prior to the application of the fluid or for a mold buffing step after application of the fluid. In these two uses, only the cloth 202 is used and either the tank 112 is empty, or the tank 112 is fitted with a valve positioned at the fluid outlet, controlled mechanically by the user or electrically by the control unit 110 between an open or closed position.

In order to view the quantity of fluid product which is applied and thus check that the correct quantity is applied, the tank 112 is graduated.

To be able to fill the tank 112 during application, or use different fluid products, the tank 112 is preferably removable.

Figure 10:
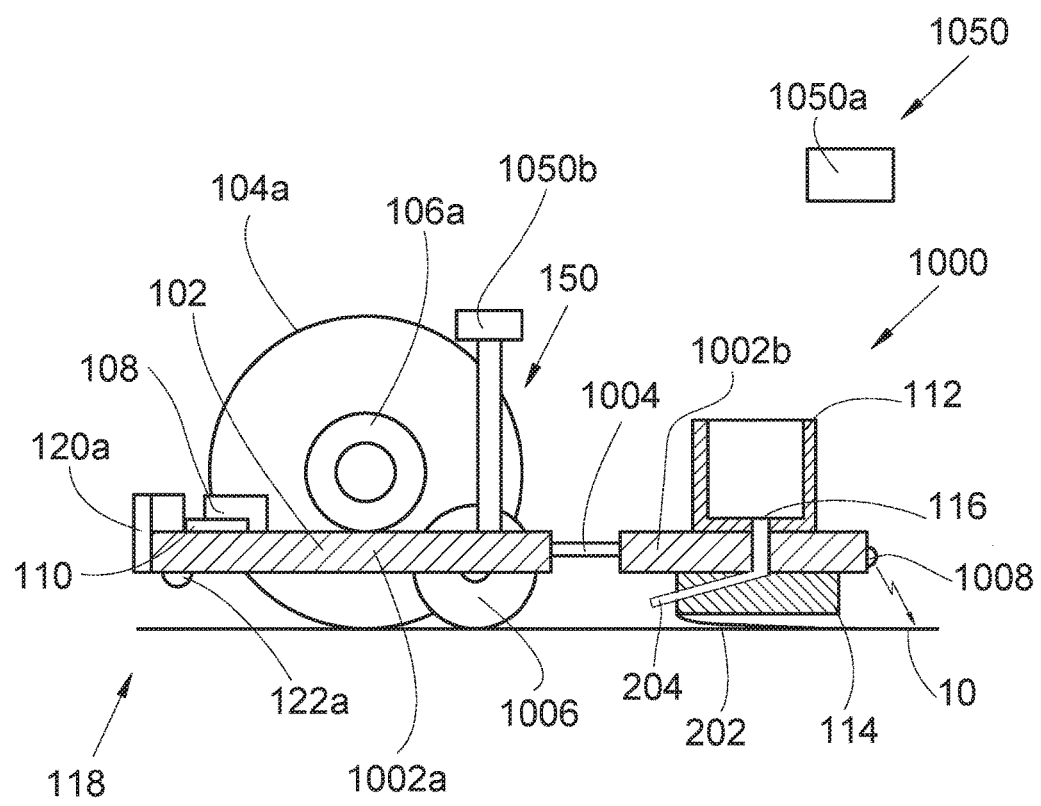
FIG. 10 shows a side view and in a section view through a vertical median plane, an application system according to another embodiment.

FIG. 10 shows an application system 1000 which comprises different options that can be implemented in accordance with one or several of the application systems previously described.

The frame 102 of the application systems of the FIGS. 1, 2, 4 and 5 can be made of a towing frame 1002*a* and a drawn frame 1002*b*. The towing frame 1002*a* carries among other, the locomotive system 150 with the two wheels 104*a-b* and the motor-drive system 106 with the motors 106*a-b*. The drawn frame 1002*b* carries among other, the application head 114 with the distribution means and the ejection nozzle 204.

The link between the towing frame 1002*a* and a drawn frame 1002*b* is realized by a fastener 1004 which is flexible for allowing a free vertical positioning of the drawn frame 1002*b* with respect to the towing frame 1002*a*. In this way, even in case of irregularities of the surface 10, the application head 114 and the cloth 202 remain in contact with the surface 10.

The fastener 1004 takes for example the form of a cardan.

For each of the application systems previously described, the ejection nozzle 204 can be oriented forward the application head 114 in order to spray the surface 10 forward the cloth 202 by projecting very small droplets of the fluid product.

In the embodiments described above, it has been more particularly described a progress of the application system in the form of round trips, but it is also possible to record in a memory of the application system 1000 and more particularly of the control unit 110, a path to follow on the surface 10 from a start point. The guiding system 118 is adapted to read the path, bring the application system 1000 to the start point and to lead the application system 1000 according to the path.

To select the path to follow, it is possible to install a man machine interface, such as a tactile screen, through which the operator selects the path to download in the memory.

It is also possible to have a database in which each path which can be followed is assigned to a unique barcode assigned to the surface 10. The application system 1000 is equipped with a barcode reader.

By attaching or realizing a barcode corresponding to the surface 10 on this surface 10, when the application system 1000 reads the unique barcode, it accesses to the database and with this unique barcode, it retrieves the path to follow on the surface 10 that it can download in its memory.

To ease the reading, it is preferable to locate the barcode reader under the application system, and then when the application system passes over the barcode, it reads it.

To guide the application system 1000 along a programmed path on the surface 10, the application system 1000 comprises an indoor localization system 1050. Each of the application systems previously described can have such indoor localization system 1050. The indoor localization system 1050 can be based on different technologies. In the embodiment of the invention shown of FIG. 10, the indoor localization system 1050 comprises an emitter 1050*b* fixed on the application system 1000 and a base 1050*a*. The communication between the base 1050*a* and the emitter 1050*b* allows the localization of the application system 1000 with respect to the base 1050*a*.

As an example, the base 1050*a* is located on a side of the surface 10 which has to be sprayed. In this way, the application system 1000 repositions itself after each half-turn realized when it moves forward on the surface 10.

To count the distance travelled by the application system 1000, the application system 1000 can be equipped with an odometer 1006 which comprises a wheel which rolls on the surface 10 and a counter which counts the number of turns made by the wheel to deduce the travelled distance. In the embodiment of FIG. 10, the odometer 1006 is independent of the wheels 104*a-b* of the locomotive system 150, but it is also possible that the wheel of the odometer 1006 is one of the wheels 104*a-b* of the locomotive system 150.

The comparison between the travelled distance thus measured and the position raised by the indoor localization system 1050 allows a permanent correction of the position of the application system 1000.

In order that the operator verifies that the spreading of the fluid product is correctly realized, the application system 1000 is equipped with at least one light 1008, for example of a LED type, arranged at the rear of the application system 1000 to illuminate the surface 10 at the rear of the application head 114, and more particularly at the rear of the cloth 202.

To compensate for the irregularities of the surface 10, each wheel 104*a-b* is mounted on the frame 102 through a suspension, like a spring for example.

FIG. 3 shows also a mobile docking station 300 which is intended to support the application system 100 to position it easier. The docking station 300 comprises an electric charging module 302 configured to charge the battery 108 and communication means in communication with a storage module and configured to transfer the data stored on the storage unit of the application system 100.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An application system for depositing a fluid product on a surface, said application system comprising:
   a frame mounted on a locomotive system ensuring the displacement of the frame over the surface in a direction of advance,
   a tank mounted on the frame and receiving the fluid product to be applied, and
   an application head fluidically connected with the tank via a supply nozzle,
   wherein the application system comprises a guiding system which comprises detectors to detect the obstacles around the application system,
   wherein the frame comprises a towing frame and a drawn frame, the towing frame carrying the locomotive system and a motor-drive system, the drawn frame carrying the application head, and the towing frame and the drawn frame are linked by a flexible fastener.

2. The application system according to claim 1, wherein the application head comprises several ejection nozzles distributed transversely under the application head and fluidically connected with the supply nozzle.

3. The application system according to claim 1, wherein the application head comprises:
- a cloth arranged under the application head, and
- at least one ejection nozzle fluidically connected with the supply nozzle and arranged so that the fluid product flowing from said at least one ejection nozzle is projected forward of the cloth.

4. The application system according to claim 1, wherein the guiding system comprises, in the direction of advance of the application system:
- two contact detectors arranged at the front of the frame, one on the port side and the other on the starboard side, and
- two void detectors under the frame and at the front of the locomotive system, one on the port side and the other on the starboard side.

5. The application system according to claim 1, wherein the application head is arranged at the rear of the locomotive system in the direction of advance of the application system.

6. The application system according to claim 1, wherein the frame comprises a main part which supports the locomotive system and a secondary part which is mounted to be rotationally mobile around the main part and which supports the tank, the application head and the supply nozzle.

7. The application system according to claim 1, wherein the frame comprises a main part which supports the locomotive system and a secondary part which is mounted to be rotationally mobile inside the main part and which supports the tank, the application head and the supply nozzle.

8. The application system according to claim 1, wherein the locomotive system comprises at least two wheels.

9. The application system according to claim 8, wherein each wheel is mounted on the frame through a suspension.

10. The application system according to claim 1, wherein the application system comprises at least one light arranged at a rear of the application system to illuminate a surface at a rear of the application head.

11. The application system according to claim 1, wherein the application system comprises a memory configured to record a path to follow on the surface from a start point, and the guiding system is adapted to read the path, bring the application system to the start point and lead the application system according to said path.

12. The application system according to claim 1, wherein the application head comprises:
- a cloth arranged under the application head, and
- at least one ejection nozzle fluidically connected with the supply nozzle and arranged so that the fluid product flowing from said at least one ejection nozzle soaks the cloth.

13. An application system for depositing a fluid product on a surface, said application system comprising:
- a frame mounted on a locomotive system ensuring the displacement of the frame over the surface in a direction of advance,
- a tank mounted on the frame and receiving the fluid product to be applied, and
- an application head fluidically connected with the tank via a supply nozzle,
- wherein the application system comprises a guiding system which comprises detectors to detect the obstacles around the application system,
- wherein the locomotive system comprises two parallel tracks, the tread of each track comprises several suckers, and the application system comprises a vacuum generation device fluidically connected to each sucker in order to generate vacuum at each of the suckers in contact with the surface.

* * * * *